United States Patent
Storms et al.

(10) Patent No.: US 7,542,886 B2
(45) Date of Patent: Jun. 2, 2009

(54) METHOD AND APPARATUS FOR EXTENSIBLE UTILITY NETWORK PART TYPES AND PART PROPERTIES IN 3D COMPUTER MODELS

(75) Inventors: Craig Storms, Concord, NH (US); Gary Blais, Hopkinton, NH (US); Lisa Fox, Sandown, NH (US); Gunjan Choudhary, Nashua, NH (US); Jitender Singh Uppal, Goffstown, NH (US)

(73) Assignee: AUTODESK, Inc., San Rafael, CA (US)

( * ) Notice: Subject to any disclaimer, the term of this patent is extended or adjusted under 35 U.S.C. 154(b) by 553 days.

(21) Appl. No.: 11/340,986

(22) Filed: Jan. 27, 2006

(65) Prior Publication Data

US 2007/0180425 A1    Aug. 2, 2007

(51) Int. Cl.
G06F 17/50 (2006.01)
G09G 5/00 (2006.01)

(52) U.S. Cl. .................. 703/2; 703/6; 700/97; 715/700
(58) Field of Classification Search .................. 703/22, 703/2, 6; 715/700, 234; 345/700; 700/97
See application file for complete search history.

(56) References Cited

U.S. PATENT DOCUMENTS

| | | | |
|---|---|---|---|
| 3,867,616 A | 2/1975 | Korelitz et al. | |
| 5,062,068 A | 10/1991 | Kondo et al. | |
| 5,063,505 A | 11/1991 | Pate et al. | |
| 5,260,883 A | 11/1993 | Wilson | |
| 5,517,428 A | 5/1996 | Williams | |
| 5,557,537 A | 9/1996 | Normann et al. | |
| 6,405,156 B1 | 6/2002 | Kern et al. | |
| 6,701,288 B1 | 3/2004 | Normann et al. | |
| 6,757,576 B2 | 6/2004 | Greer et al. | |
| 6,778,871 B2 | 8/2004 | Holman et al. | |
| 2003/0036889 A1 | 2/2003 | Goodman et al. | |
| 2003/0061011 A1 | 3/2003 | Hoeft | |
| 2004/0201600 A1* | 10/2004 | Kakivaya et al. | 345/700 |
| 2005/0172260 A1 | 8/2005 | Eichstaedt et al. | |
| 2006/0288023 A1* | 12/2006 | Szabo | 707/100 |

\* cited by examiner

Primary Examiner—Thai Phan
(74) Attorney, Agent, or Firm—Patterson & Sheridan LLP

(57) ABSTRACT

One embodiment of the invention provides a method for extending a schema of network parts types and part type attributes hard-coded by a CAD application. The network parts may be used to compose a CAD model. Users may extend the network part schema by adding an attribute or property for an existing network part, or define an entirely new part by associating the new network part with a set of part type attributes. At the same time, the CAD application may use either a hard-coded or dynamically assigned enumeration value to perform a variety of functions using both the hard-coded and user declared network part types and part properties. For example, functions such as searching a network part list or traversing the elements included in a CAD model may operate using the enumeration values, allowing the CAD application to perform these operations efficiently.

21 Claims, 7 Drawing Sheets

| PART TYPE (N) 618 | GLOBAL PART STRING 620 | LOCAL STRING 625 |
|---|---|---|
| Autodesk_Enum_Junction (101) | Structure_Junction | Junction |
| Autodesk_Enum_Inlet/Outlet (102) | Structure_Inlet/Outlet | Inlet/Outlet |
| Autodesk_Enum_Headwall (103) | Structure_Headwall | Headwall |
| ... | ... | ... |
| Custom_Enum_0 (501) | Structure_Utility_Pole | Utility Pole |
| Custom_Enum_1 (502) | Structure_Grate | Custom Grate |

610 = Autodesk_Enum rows; 615 = Custom_Enum rows; 630, 635 labels

| PART 701 | PART PROPERTY ENUMERATION 702 | GLOBAL STRING 705 | LOCAL STRING 710 | DATA TYPE 715 | DATA STORAGE 720 | UNITS 725 | VISIBILITY 730 |
|---|---|---|---|---|---|---|---|
| 200 | 601 | Type_Swept_Shape | Cross_Section_Shape | String | Constant | — | True |
| 101 | 602 | Junction_Vertical_Clearance | Vertical_Clearance | Decimal | Constant | Inch | True |
| 501 | (1001) | Utility_Pole_Height | Pole_Height | Decimal | Constant | Inch | True |

735

METHOD AND APPARATUS FOR EXTENSIBLE UTILITY NETWORK PART TYPES AND PART PROPERTIES IN 3D COMPUTER MODELS

BACKGROUND OF THE INVENTION

1. Field of the Invention

The present invention generally relates to computer software. More specifically, the present invention relates to computer software applications configured to facilitate the interactive design of computer generated models of utility networks.

2. Description of the Related Art

Currently, computer-aided design (CAD) applications are available that allow a designer or engineer to compose graphical models of real-world three-dimensional (3D) structures. For example, an engineer or designer may use a CAD application to construct a graphical representation of a utility network such as a gas pipeline, an electric power-grid, or a surface water drainage network. These CAD applications may be used to compose two- and three-dimensional CAD models of the utility network from model elements that correspond with real-world counterparts, e.g., pipes, conduits, manhole covers, catch basins, and other pipe and structure elements. Further, such CAD applications may present users with a catalog-like display of the elements that may be used in a CAD model as separate "objects" or "parts." Thus, rather than compose a graphical CAD model by drawing individual lines or geometric shapes, an engineer may compose a CAD model using graphical representations of objects that correspond with the components used to build the real-world structure. This technique provides an intuitive, flexible method for generating a CAD model of a utility network.

The network parts that are available for a CAD model are typically hard-coded and are provided as part of the CAD application or an associated "parts catalog" or "part database." Each part may be associated with a set of attributes or properties related to the part. For example, a manhole part may have attributes such as a radius, a material, a weight, etc., and a pipe part may have attributes such as pipe-material, size (e.g., length and diameter), flow properties, etc. When a user selects a particular part to include in a 3D model, the user may be prompted to supply values for the attributes, or the properties may be predefined for that part.

Defining each network part in advance allows the CAD application to be "aware" of what parts are available, and what attributes or properties are associated with each individual part. Developers building the CAD application use the "awareness" of the hard-coded parts to write very efficient logic for searching, displaying, querying, and otherwise processing a CAD model. For example, the CAD application may be configured to display, query, and perform additional functions using the hard-coded part types and part properties. In addition, the CAD application may allow users to create functions to analyze aspects of the CAD model based on the network parts (e.g., functions to calculate part sizing or construction requirements). Typically, users or 3$^{rd}$ party developers write these functions using an API. The API may include functions for setting, querying, and retrieving values regarding the hard-coded network part types part attributes present in a given CAD model.

On the other hand, configuring the CAD application and/or parts catalog in advance, restricts users to the "universe" of parts provided by the CAD application. Very often, however, users may desire to modify an existing part by adding an attribute or property or to define an entirely new part (and an associated set of attributes and properties). To address this need, users may work with the developers of the CAD application to request revisions or changes, allowing the desired attribute to be hard-coded into the CAD application and/or parts catalog. One drawback to this approach is that it may place significant stress on developer resources, as developers must be removed from other tasks to add the desired attributes or properties to the parts. Further, some attributes or properties may only be of use to a limited group of users, and hard coding a global extension to the CAD application may be impractical. Additionally, much of the time, end-users simply do not have direct access to the developers.

Another common issue with CAD applications used to model real world data is the ability of the CAD application to characterize the real world model is necessarily limited to manage the scope of a CAD application release, and feedback from users identifying additional model requirements or desired capabilities tends to occur after the CAD applications released. Thus, users must often wait for a subsequent release to incorporate desired features.

Another drawback to this approach is that different users must ensure that they have the correct versions of the CAD application or parts catalog to view a particular CAD model; otherwise. If the same version is unavailable, different users may be unable to share a CAD model with one another.

Another approach used by some CAD applications is to allow users to define metadata for the elements of a CAD model. For example, a CAD application may allow a user to create an annotation for a part (or group of parts) included in a particular CAD model. However, in this approach, the attributes and properties associated with the part are not modified, and the modifications are instead localized to the specific part being annotated. If the added property is meant to be a "global" extension, then the user must annotate each instance of the part in the CAD model, a time-consuming and error-prone process. Further, when presenting users with a graphical display of what properties or attributes are associated with a particular network part, the annotations or metadata may provide only limited usefulness. For example, CAD applications often provide the ability to generate two-dimensional (2D) engineering drawings or construction documents from a CAD model. Such 2D drawings often include schedules of attribute types and values for some (or all) of the network parts represented in the drawing. Without the ability to identify the different attributes associated with a specific network part, the CAD application may be unable to properly create a desired schedule for a 2D drawing generated from a 3D model.

Accordingly, there remains a need for a CAD application that does not confine users to composing a computer generated model from a limited number of parts provided by a CAD application and/or parts catalog. Further, to be useful, the process of adding new part types or part attributes should not require having a developer hard code new network parts types or part attributes into the CAD application. Further, the mechanism for adding part types or part attributes should seamlessly integrate with application—specific part types and properties. Lastly, different users should be able to share copies of a CAD model with one another, without being forced to ensure that each has the same "network part set."

SUMMARY OF THE INVENTION

Generally, a CAD application may be used to compose 2D and 3D models from a collection network part objects (or more simply, "parts"). Embodiments of the invention include a method, computer-readable medium, and computing device that provide an extensible network part schema used by such a CAD application.

In one embodiment, the CAD application may provide a collection of hard-coded part types, each with an associated set of attributes. Users ma collection by declaring new attributes for a network part and may also declare custom network parts by specifying a set of existing (or new) attributes to associate with a new custom part. Although embodiments of the invention are described herein using a three-dimensional (3D) model as an example of a computer generated model configured with extensible network part schema, embodiments of the invention are not limited to 3D computer models. Rather, embodiments of the invention may be adapted to both two dimensional and three dimensional models of utility network systems.

The CAD application may be configured to manage the network part schema using an extensible part type list. New part types may be associated with a collection of attributes corresponding to the part. The attribute collection is extensible in a similar manner. When a user declares an extended attribute for a network part, the extension may be associated with the network part type being extended. Two or more parts may be associated with a particular attribute. Further, the CAD application may be configured to operate with the extended part types and part attributes in the same manner as network parts that are hard-coded as part of the CAD application.

In one embodiment, the network parts list may associate each network part and each attribute with a unique enumeration value. The enumeration value provides a 1-to-1 relationship between the enumeration value and a given network part. Similarly, the enumeration value for each part attribute provides a 1-to-1 relationship between the enumeration value and a given part attribute. The enumeration value associated with a hard-coded network parts may be hard-coded with the CAD application. Additionally, the CAD application may dynamically assign a unique enumeration value to each network part types and part attribute that are part of an extended network part schema. By using different ranges of values (e.g., numeric ranges), the CAD application may distinguish a hard-coded network part or part attribute from an extended one. Each network part and part attribute may also be associated with a unique global identifier (e.g., a text string). The global identifier may be used to distinguish part types and part attributes from one another, whether extended or hard-coded.

Each network part and part attribute may also be associated with a local identifier that provides a name used in graphical displays generated by the CAD application. The global and local identifiers may be saved as part of the 3D model, allowing users to share 3D models with one another. At the same time, assigning an enumeration value to the extended network part types allows the CAD application to integrate the extended network part schema with the hard-coded network parts and attributes. For example, functions such as searching the network part list or traversing the elements included in a CAD model may operate using the enumeration values, allowing the CAD application to perform these operations very efficiently, and enabling application developers to work with standard enumerations defined in C++ and over programming languages. When a user opens a 3D model, any parts with a hard-coded global identifier are associated with the hard-coded enumeration value, and network part types or part attributes with a global identifier not recognized by the CAD application may be assigned an extended enumeration value. The global identifier is saved with the CAD model to allow the extended network part schema to persist over multiple editing sessions, and to share the CAD model and extended network part schema with other users.

Functions provided by the CAD application that operate using the enumeration values stored by network part list will automatically integrate any part types and part properties declared for a particular 3D model. For example, to display a list of attributes associated with a particular part, the CAD application may walk through the part enumerations and display the local identifier for each network part attribute associated with the given part, whether hard-coded or extended. Similarly, functions such as type, value, and range checking provided for the hard-coded parts are also available for (or may be applied to the) parts in the extended network part schema.

Thus, the CAD application may manipulate the extended network part schema in the same manner as the hard-coded network parts without the need for a developer or end user to modify the CAD application or create a custom application. To a user interacting with the CAD application, both the hard-coded network parts and the extended network parts operate and behave in the same manner. There is no need to attach special data or otherwise work around the limitation of the hard coded part schema. Further, extensions to a given network part may occur "globally;" once an additional attribute is declared for a part provided by the CAD application or parts catalog, each instance of the part will adopt the extended attribute. Users may specify whether an extended attribute is optional or required, and also specify the characteristics of an extended attribute such as a data type, a local display name (i.e., a local string), etc.

In one embodiment, the extended network part schema is saved as part of the CAD model and retrieved by the CAD application each time a CAD model is opened for display in a user interface. In a particular embodiment, the extended network part schema may be stored with the CAD model using a markup language, such as XML. Additionally, the CAD application may include an API that provides functions for setting, querying, and retrieving values for the extended network part types and part attributes from a 3D model. These functions may be used to operate on an extended network part schema without any "awareness" of which network parts are hard-coded and which are extensions declared for a particular 3D model.

BRIEF DESCRIPTION OF THE DRAWINGS

FIGS. 6 and 7 illustrate a data table used by the CAD application to manage a network part schema, according to one embodiment of the invention.

DETAILED DESCRIPTION OF THE PREFERRED EMBODIMENTS

Embodiments of the invention provide a method, apparatus and article of manufacture for creating a CAD of a utility network. The CAD model may be composed from a variety of network part objects (or more simply, just "parts"). Each part included in a CAD model may correspond to a real-world component of a utility network. Similarly, the CAD model may include a representation of the geography and terrain features for a real world location where the utility network exists, or may be constructed. In one embodiment, the CAD application may provide a collection of hard-coded part types, each with an associated set of attributes. Users may extend the network part types and part properties by declaring additional attributes to associate with a network part provided by the CAD application or parts catalog, and may also declare custom network part by specifying a set of existing (or new) attributes to associate with the custom part. Together the hard-coded parts and any declared extensions provide a network part schema associated with a particular CAD model.

The following discussion describes an embodiment of a CAD application that may be used to model a surface water utility network using network parts such as pipes, manholes, catch basins and storm sewers. However, embodiments of the invention are not limited to modeling utility networks of any single type and may be extended to other utility networks. For example, embodiments of the invention may be adapted to various model utility networks such as telecommunications networks, pipeline networks, power grid networks, HVAC networks, etc.

Figure 1:
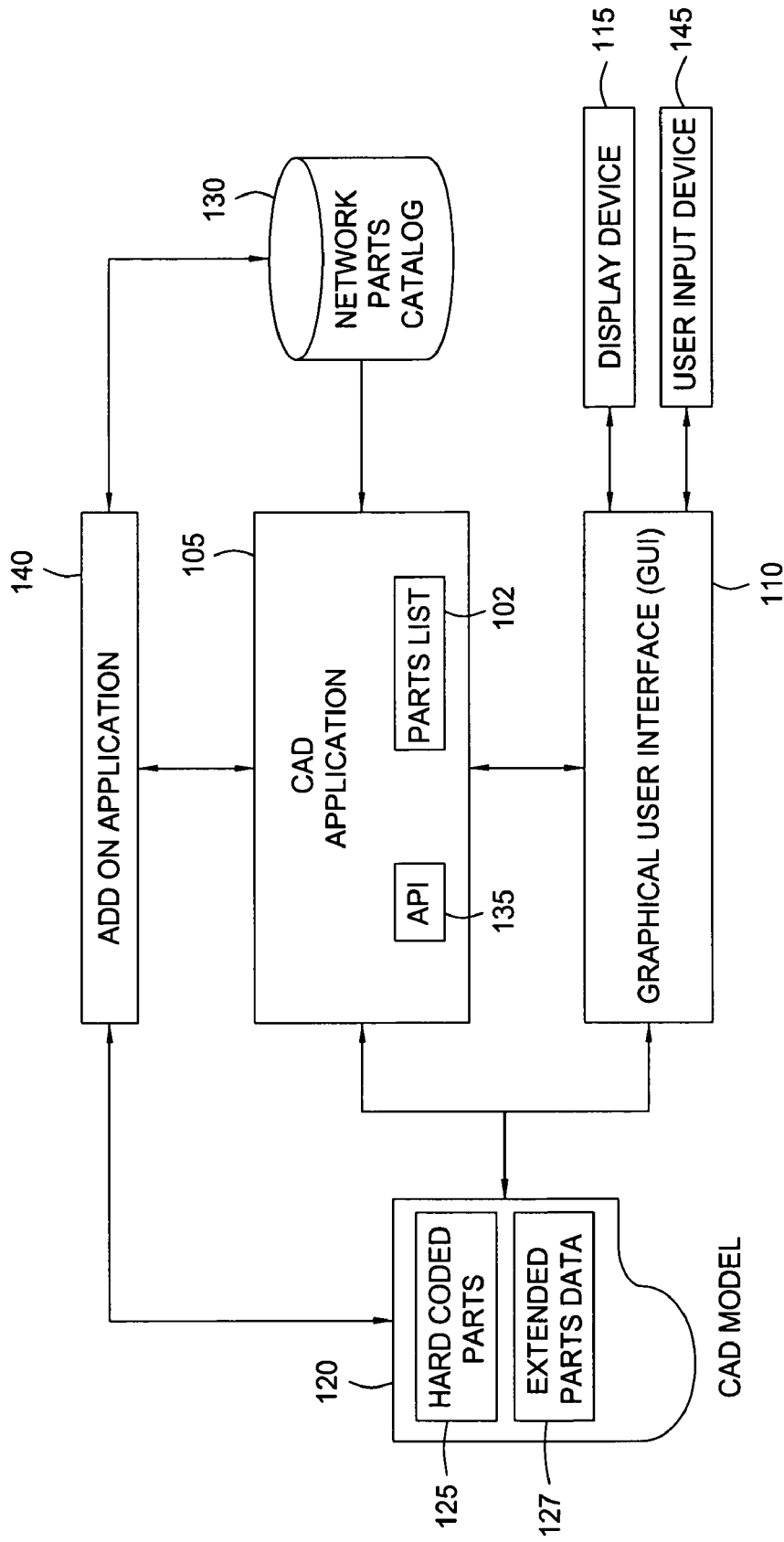
FIG. 1 is a block diagram illustrating a system for composing a CAD computer model of a utility network, according to one embodiment of the invention.

FIG. 1 is a functional block diagram illustrating an exemplary computing environment 100 for generating a 3D computer model 120 of a utility network. As shown, the environment 100 includes, without limitation, CAD application program 105, add-on application 140, graphical user interface 110, CAD model 120, user input devices 145, display device 115, and network parts catalog 130.

In one embodiment, the components illustrated in environment 100 may be implemented using computer software applications executing on existing computer systems, e.g., desktop computers, server computers, laptop computers, tablet computers, and the like. The software applications described herein, however, are not limited to any currently existing computing environment or programming language, and may be adapted to take advantage of new computing systems as they become available. Additionally, the components illustrated in FIG. 1 may be executing on individual computer systems or distributed systems communicating over computer networks including local area networks or large, wide area networks, such as the Internet. For example, a graphical user interface may include a software program executing on a client computer system communicating with a CAD application and a network parts catalog residing on a networked server computer.

The CAD application 105 provides a computer program configured to allow a user interacting with GUI interface 110 to generate a CAD model 120. Preferably, the Civil 3D® application program and associated utilities available from Autodesk®, Inc. may be used. The data attributes, properties, geometry data and network part schema may be stored in CAD model 120.

The graphical user interface 110 may provide GUI elements (e.g. menus, buttons, drop-down lists, check-boxes, etc.) that allow a user to select, add, and modify the network parts included in the CAD model 120. Display device 115 provides a visual representation of the CAD model 120. The CAD application 105 may use CAD model 120 to generate a variety of views or graphical representations of the CAD model 120 displayed on display device 115, as well as to generate 2D engineering and construction documentation. Input devices 145 allow a user to interact with the CAD model 120 and GUI interface 110. User input devices 145 may include a mouse pointing device and a keyboard, and display device 115 may comprise a CRT monitor or LCD display.

The network parts catalog 130 provides a collection of parts available for use in composing a CAD model 120 of a utility network. Typically, the network parts represent real-world constructs (e.g., pipes, catch basins, manholes, etc.). Each network part may be associated with a set of attributes or properties used to characterize the part. For example, part attributes may describe physical characteristics of the part such as size, material, weight, length, diameter, etc., and attributes may also be used to characterize other aspects of a part such as manufacturer, costs, suppliers, etc. In one embodiment, the CAD application 105 may be configured to manage a network part schema that includes both the parts available from catalog 130 and extensions to the parts declared by a user composing the CAD model 120. Extensions to the network part schema may be related to additional physical characteristics of the network part or to other aspects of the network part, or a particular project.

The CAD 105 application may be configured to manage the network part schema using extensible part list 102. The part list 102 identifies the set of attributes associated with a given network part. When a user declares an extended attribute for a network part, the extension is reflected in the network part list 102. An example of the part list 102 is shown in FIGS. 6 and 7, described below. Additionally, the extension is reflected in the CAD model 120. As shown, CAD model 120 includes a collection of both hard-coded parts 125 and the extended parts data 127. The hard-coded parts 127 represent instances of parts that have been included in CAD model 120. Extended parts data 127 represents declared extensions to the hard-coded parts 125. The extended parts data 127 may include both new network parts as well as new attributes for existing parts. Together, hard-coded parts 125 and extended parts data 127 provide a network part schema for the CAD model 120.

In one embodiment, users interact with GUI interface 115 to extend the schema of parts provided by parts catalog 130. The extensions declared for a part or part attribute are integrated into the features and functions provided by the CAD application 105 and GUI interface 110, and also stored persistently as part of the CAD model 120 using extended parts data 127. For example, FIGS. 2 and 3 illustrate elements of graphical user interface 110 displaying attributes of a CAD model that includes an extended network part schema 470, according to one embodiment of the invention.

Figure 2:
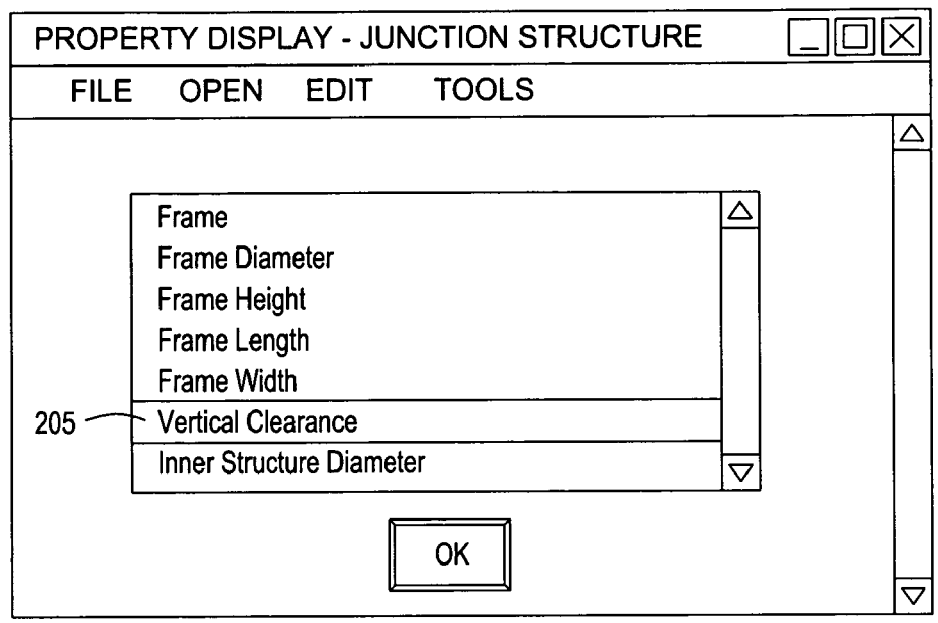
FIGS. 2 and 3 illustrate elements of a graphical user interface displaying attributes of an extended network part schema, according to one embodiment of the invention.

FIG. 2 illustrates an exemplary graphical dialog box 200 displaying a list of properties associated with a network part. In this example, a user has extended the attributes for a "junction structure" network part to include a "vertical clearance" attribute. Although not included in the attributes hard-coded by application 105 and parts catalog 130, the GUI interface 110 displays the "vertical clearance" extended attribute 205 in the list of attributes for the "junction structure" part. To generate this display, the CAD application 105 and user interface 110 may be configured to walk through the part list 102, and select the appropriate parts for display.

Figure 3:
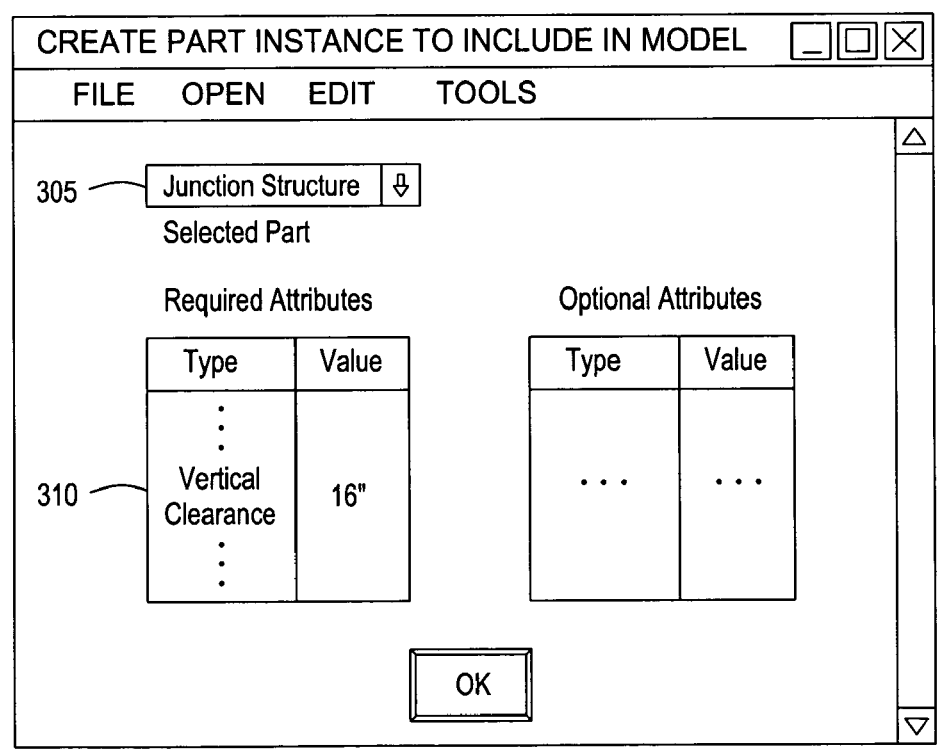

Similarly, FIG. 3 illustrates a dialog box 300 in response to a user selecting to add an instance of the junction structure to a CAD model 120. As shown, drop down list 305 is set to the example of the "junction structure" part. The required attributes list includes the extended part attribute 310 labeled "vertical clearance" for the "junction structure," 305 after a user has set the value for the attribute to sixteen inches.

API 135 may be used to develop add-on application 140. The API 135 provides a software interface to the services or software libraries included with the CAD application 105. API 135 may include classes, function or method calls, subroutine calls, descriptive tags, etc. Using the API 135, a developer may create an add-on application to read, manipulate and analyze a CAD model 120, including the extended parts data 127. For example, using the "vertical clearance" attribute declared for the "junction structure" part, and add-on application 140 may include routines configured to traverse the network parts included in a CAD model 120 to verify that for any instances of the "junction structure" part, the "vertical clearance" is greater than a minimum value required for a given construction project.

Figure 4:
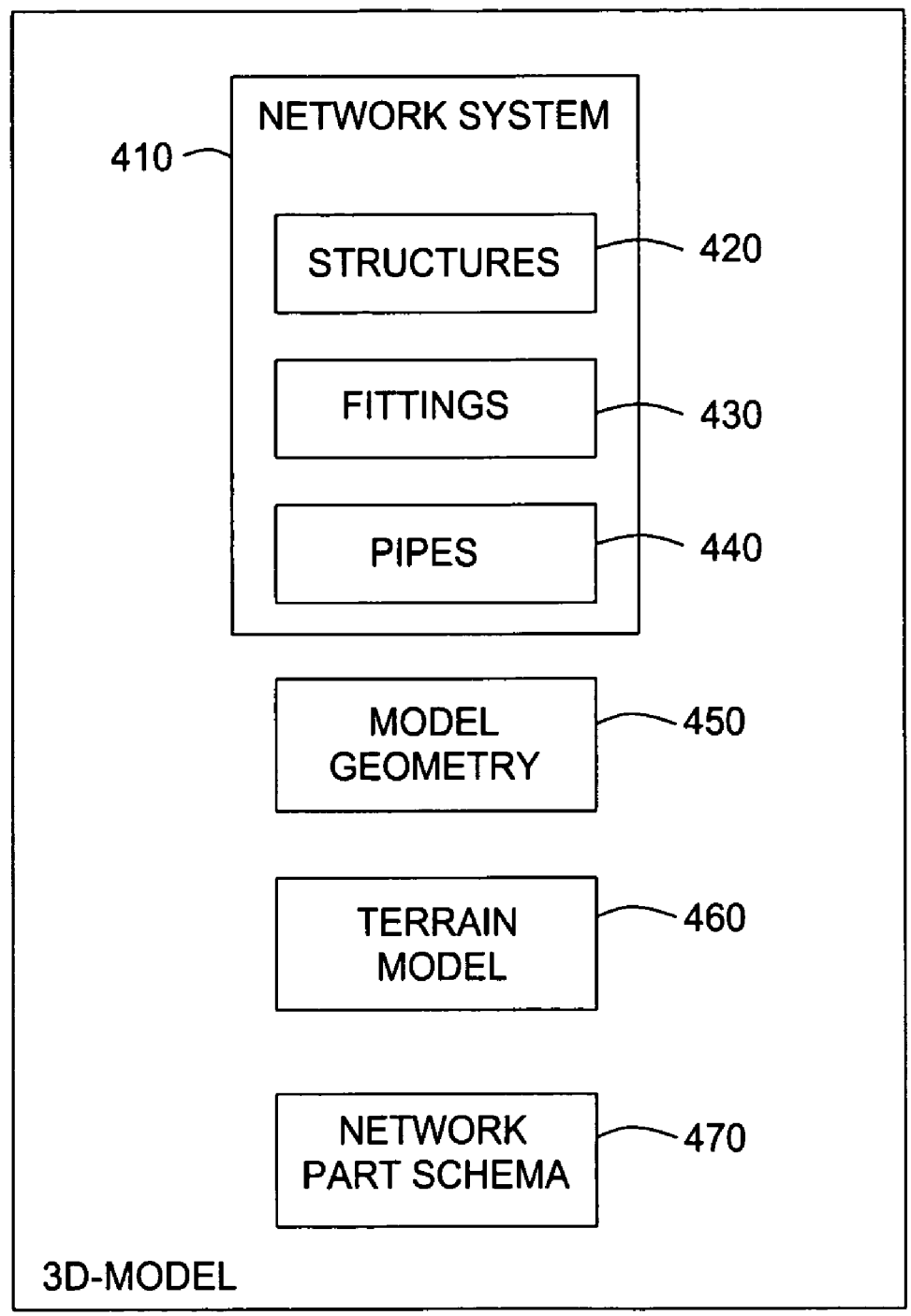
FIG. 4 is a block diagram illustrating elements of a CAD model, according to one embodiment of the invention.

FIG. 4 is a block diagram illustrating elements of a CAD model 120, according to one embodiment of the invention. As shown, the CAD model 120 includes one or more utility network systems 410, each including the network parts of a particular utility network being modeled. The CAD model 120 also includes model geometry 450, terrain model 460, and network part schema 470. Network part schema 470 identifies a collection of parts included in the CAD model 120, including extended attributes and extend parts. The model geometry 450 is used to relate the positions of the parts included in a CAD model with terrain model data 460. The terrain model data 460 corresponds to the topology present for a particular location; typically, the geography of the real-world location being modeled.

Figure 5:
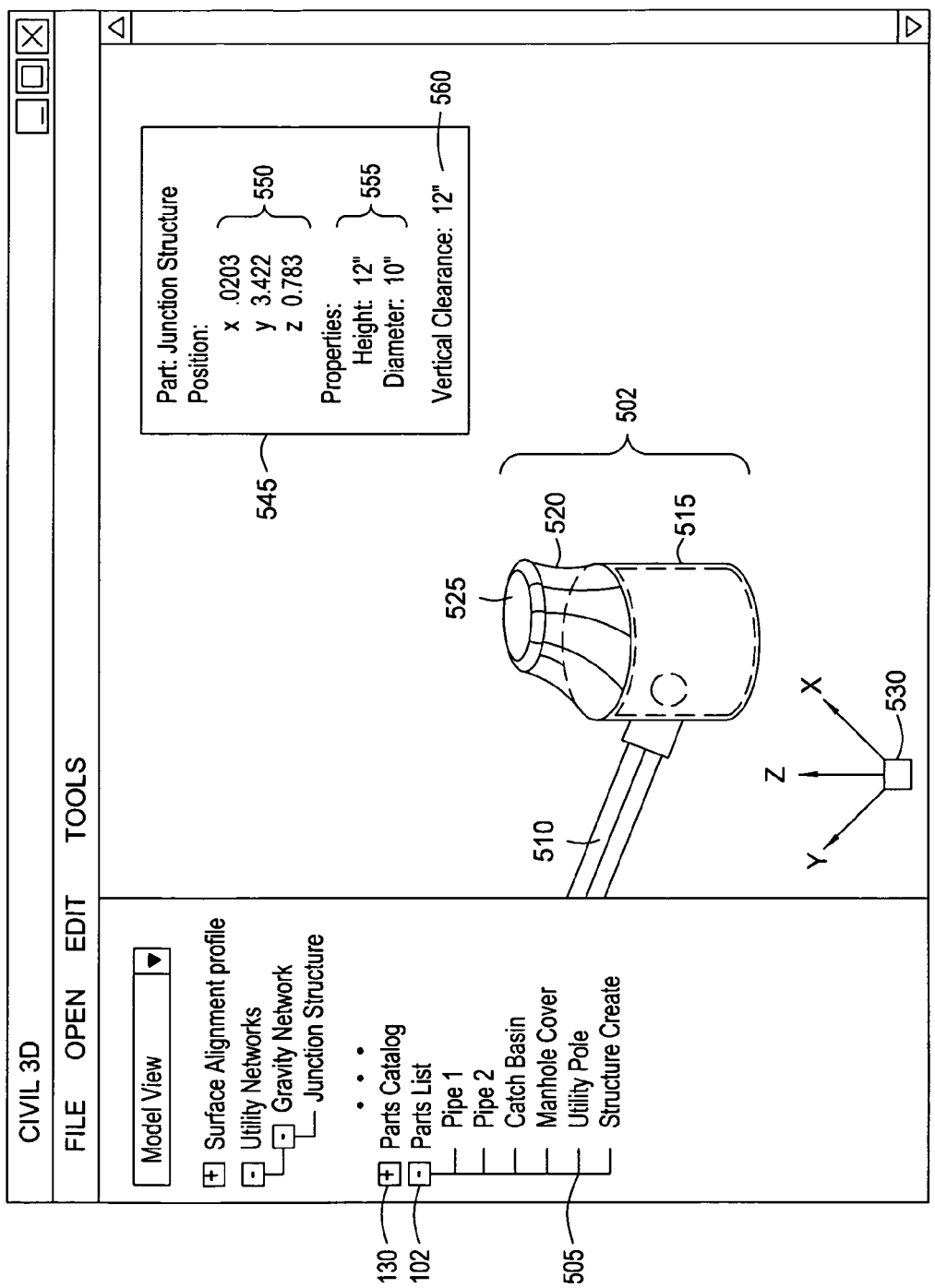
FIG. 5 illustrates a CAD model of a utility network, according to one embodiment of the invention.

FIG. 5 illustrates a screenshot 500 of a portion of CAD model of a utility network composed from a set of network parts, according to one embodiment of the invention. In this example, the screenshot 500 illustrates a view of the CAD model 120 displaying a catch basin 502 and pipe 510. The catch basin includes a cover part 525, a collar part 520 and barrel section part 515. View 500 illustrates schedule 545 overlaid on the display of the CAD model 120. The schedule 505 displays the attributes for the junction structure 502. Attributes 550 display the coordinate location of the junction structure part in the CAD model 120. The location may be relative to the terrain model 460. In addition, properties 555 display the values for the hard-coded attributes such as the height and diameter of the junction structure. In addition, the extended attribute 560 "vertical clearance" is displayed on schedule 545. Likewise, any 2D engineering or construction documents generated from CAD model 120 may include a schedule displaying both the hard-coded and extended network property attributes of the "junction structure" part 502.

Perspective indicator 530 indicates that the screenshot 500 illustrates the CAD model 120 from a 3D perspective using the X and Y axes to represent a grid-based location of a part element in the CAD model and the Z axis to represent an elevation. For example, part location data 550 indicates the X, Y, and Z coordinates of the "junction structure" part highlighted in schedule 545. Any of the catch basin elements may be selected and modified, or other parts may be selected and added to the CAD model 120.

As described, the CAD application 105 may be used to create a CAD model 120 of a utility network from the collection of network parts. Further, embodiments of the invention allow users to declare extensions to the network part types and part attributes used within a given CAD model 120. FIGS. 6 and 7 illustrate an embodiment of the parts list 102 used by the CAD application to manage 105 extensions to part attributes and part properties (i.e., to the network part schema 470 associated with a particular CAD model 120).

FIG. 6 illustrates a data table used by the CAD application 105 to manage a network part schema 470, according to one embodiment of the invention. As shown, table 600 includes a part type column 618, a global string column 620, and a local string column 625. The part type column 618 stores a unique enumeration value for each network part type used in the network schema 470. Illustratively, the part types in table 600 include both the hard-coded network parts shown in rows 610, and the custom network parts shown in rows 615. The enumeration values in table 600 are represented using integers. In this example, part types are shown in parentheses following the part type. For example, row 630 stores an enumeration value of "101," for the "Structure_Junction" network part, and row 635 stores an enumeration value of "501," for the "Structure_$_{Utility\_}$Pole" network part. The range of integers used for the hard-coded parts may be distinct from a range used for the extended network parts. In this case, an enumeration value up through "499" is used to represent a hard-coded network part type and an enumeration value of "500" and greater is used to represent an extended network part type defined for the network part schema 470 as part of the CAD drawing 120. Thus, the CAD application 105 may distinguish a hard-coded network part from an extended network part declared by a user based on the enumeration value. In one embodiment, the CAD application 105 may use the enumeration values to perform functions such as indexing, searching or other functions that traverse through the enumeration values.

Global string column 620 stores a text-based string that may also be used to identify each network part. The global string provides a unique identifier that may be stored as part of a CAD model 120 as part of network part schema 470. Additionally, table 600 includes local string column 625 that may be used to store a text label for the network part. This label may be presented to users in graphical displays generated by the CAD application 105. For example, row 630 includes a label "Junction," and row 635 includes a label "Utility Pole." These labels may be used in a parts list display, like the ones shown in FIGS. 2 and 3.

The rows in table 600 may be populated each time a user selects to open a CAD model 120. When opening a CAD model 120, the CAD application 105 may be configured to recognize any hard-coded network parts from the global string value stored with the network part schema 470. Recognized global strings are then associated with the correct enumeration value hard coded by CAD application 105. For example, if the CAD model 120 includes a part identified by the "Structure_Junction" global string, then the CAD application associates this part with the hard-coded enumeration value "101."

At the same time, for any global string values not recognized by the CAD application 105, the unrecognized part or part attribute is assigned an extended enumeration value. For example, if the CAD model 120 includes a part identified by the "Structure_Utility_Pole" global string, then the CAD application may assign the next available dynamic enumeration value to this part. For example, the enumeration value "501" assigned to the "Custom_Enum_0" shown in row 635. Thus, the enumeration value assigned to an extended network part may change over multiple editing sessions involving the same CAD model 120. However, once defined for an extended part type or extended part attribute, the global string remains the same, allowing extensions to the network schema to migrate between users or editing sessions.

FIG. 7 illustrates a data table used by the CAD application to manage a network part schema 470, according to one embodiment of the invention. As shown, each row of table 700 associates a network part attribute with a network part (as specified by column 701). For example, row 735 defines an attribute for the network part "501" (illustrated in row 635 of table 600). Table 700 includes also columns 702-730, illustrating values related to each individual network part attribute. In this manner the runtime configuration of the part type and property schema distinguishes internally hard coded enumerations from extended part types and properties, and configures them for use by the CAD application 105.

In one embodiment, the network part attributes stored in table 700 are associated with one or more network part types. The particular network part is identified by the enumeration value in column 701. For example, row 735 illustrates a network part attribute associated with the part identified by the enumeration value "501." Global string column 705 stores a unique identifier used to identify the network part attribute in the network part schema 470, and local string column 710 stores a text label for each network part attribute. For example, the part property with the assigned enumeration value of "1001" is associated with the global string of "utilitly_pole_height" and the local string value of "pole height." This part attribute is itself associated with a network part with an assigned enumeration value of "501". The global string of "utilitly_pole_height" is used to identify this attribute within a saved drawing. Because this part property is not hard coded into CAD application 105, an enumeration value (e.g., "1001") is assigned to this part property each time a drawing in which it is saved is opened by the user. The "pole height" local string may be presented to users in graphical displays generated by the CAD application 105. Note, the part type of "501" in the part column 701 of row 735 illustrates that the data for this part property is associated with the part type "Custom_enum_0" listed in row 635 in the data table 600 if FIG. 6.

Additionally, the network part attributes stored in table 700 may also include an enumeration value, used for efficient searching or data processing. During an editing session, each network part attribute may be assigned an enumeration value. For example, when a user selects to open/edit a model using the CAD application 105, any custom parts identified in the model may be assigned the enumeration value. In one embodiment, the hard-coded part attributes may be assigned an enumeration value from a first range of values (e.g., 0-999) hard-coded into the CAD application 105, and any custom part properties may be dynamically assigned a value from a second, different range (e.g., 1000 and above). As shown, the first two attributes include enumerations of "601" and "602," and thus, are hard-coded attributes. At the same time the part attribute "Utility_Pole_Height "in row 735 is identified by an enumeration value of "1001," indicating that this part attribute is a custom part attribute created and stored with a particular model 120. Accordingly, over different editing sessions, when a user opens the model that includes this attribute, the "Utility_Pole_Height" may be assigned a different enumeration value; while at the same time, the "Utility_Pole_Height" global string value remains constant. The different ranges of enumeration values illustrate the higher end limit available to custom attributes, and further illustrate how the enumeration value may be used to differentiate internal hard-coded attributes from extended parts and part attributes.

The remaining columns (715-730) of data table 700 specify additional characteristics of the network part attributes. As shown, these characteristics include a data type column 715, data storage column 720, units column 725 and visibility column 730. Depending on the particular embodiment, however, table 700 may include columns to manage additional, or different, characteristics of a network part attribute. Illustratively, row 735 specifies that the units for the "ultilty_pole_height" attribute are measured in inches and that this part uses a "constant" data storage type. Additional types of values for column 720 may include ranges, tables, or lists, among others.

Figure 8:
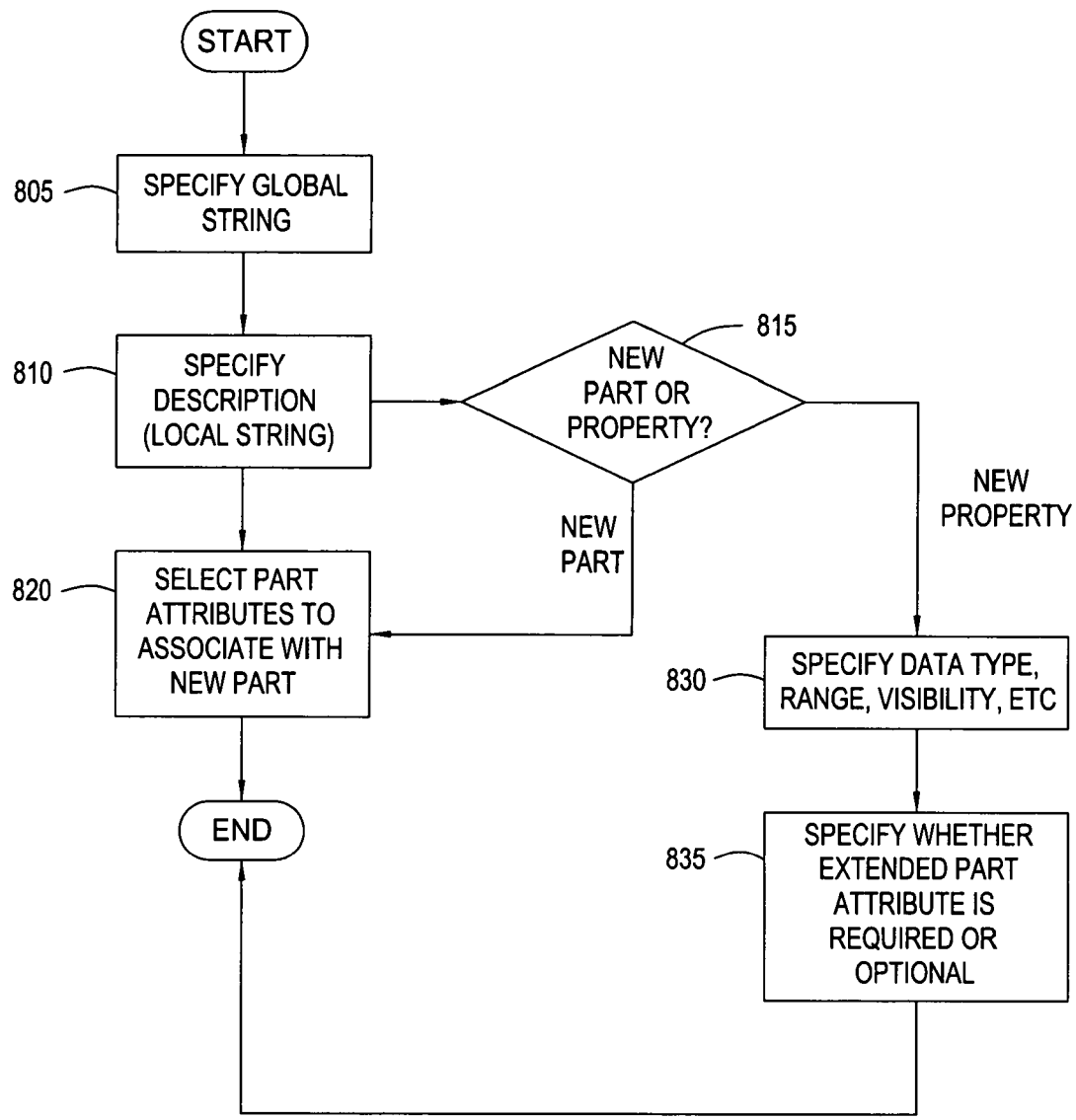
FIG. 8 illustrates a method for declaring an extension to a network part schema, according to one embodiment of the invention.
Figure 9:
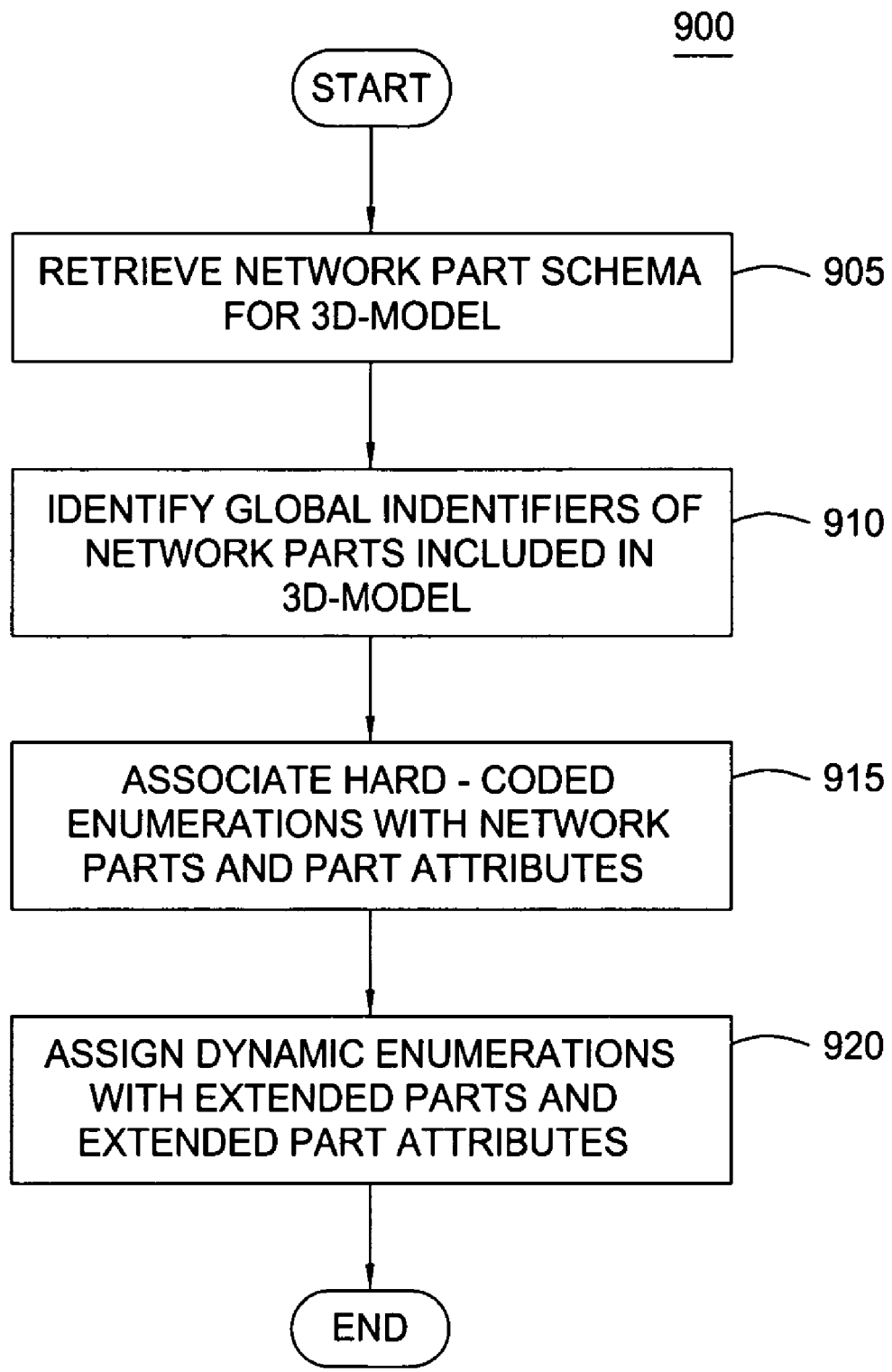
FIG. 9 illustrates a method for opening a drawing with an extended network part schema, according to one embodiment of the invention.

FIGS. 8 and 9 illustrate methods for declaring and managing an extended network part schema 470, according to one embodiment of the invention. In the methods shown in FIGS. 8 and 9, it is assumed that the user is interacting with a CAD application 105 configured according to an embodiment of the invention, as described above. Thus, the CAD application 105 may provide a collection of network parts that a user may select and place within a CAD model 120, and the CAD application 105 may further allow users to declare extensions to the network part schema 470 by specifying additional attributes to associate with a hard-coded network part, or specifying a new network part type and an associated set of network part attributes. Also, persons skilled in the art will understand that any system configured to perform the methods shown in FIG. 8 and FIG. 9, in any order, is within the scope of the present invention.

FIG. 8 illustrates a method 800 for declaring an extension to a network part schema 470, according to one embodiment of the invention. The method 800 is performed by a user interacting with CAD application 105 and GUI interface 110. The method 800 begins at step 805 where a user specifies a global string to associate with a new part or part attribute. As described above, each network part and part attribute may be associated with a global string value. In one embodiment, the global string value for each part and part attribute are stored with the CAD model 120 using a markup language such as XML. This allows a user to save the declared extensions as part of the CAD model 120 and also allows the CAD application 105 to restore the network part schema 470 each time a particular CAD model 120 is loaded. At step 810, the user specifies a local string associated with the part or part attribute being declared. As stated, this string may be used as a label in graphical displays presented to a user.

At step 815, it is determined whether the user has selected to create a new network part or to add an additional attribute to an existing network part. If the user has selected to create a new network part, then the user may identify which part attributes should be associated with the new network part at step 820. For example, the user may be presented with a list of network part attributes using a display like the dialog box 200 illustrated in FIG. 2. The available parts may be retrieved by iterating through the entries in the part attribute table 700 using the enumeration values stored in the part column 701. Additonally, a user may declare new attributes to associate with the new network part type being declared.

At step 815, if the user has selected to create a new network part attribute, then the method proceeds to step 830. At step 830, the user specifies values for the new part attribute being declared, including which network part the new network part attribute is being associated with. Also, in addition to the specifying the global string (steps 805 and 810), the user may supply part attribute information such as data type, range, visibility, etc. These values may be stored in network parts attribute table 700. However, it should be noted that characteristics defined for a part property may vary among different embodiments. Additionally, at step 835, the user may indicate whether the network part attribute being defined is required for instances of the corresponding network part. If so, then anytime a user creates an instance of the network part, a value for the extended network part attribute being declared must be supplied.

FIG. 9 illustrates a method 900 for a CAD application to open a CAD model 120 that includes an extended network part schema 470, according to one embodiment of the invention. The graphical user interface 110 may be configured to allow users to create new CAD models, save these models, and open the CAD model during a subsequent editing session. Also, users may share CAD models among one another. The method 900 begins when a user specifies a particular CAD model to open and display. At step 905, the CAD application 105 retrieves the network part schema 470 for the CAD model being opened. As described above, this data may be stored with the model using a markup language such as XML. At step 910, the CAD application 105 parses the network schema 470 to identify the global strings for the network parts included in the CAD model.

At step 915, the CAD application parses the list of global strings identified at step 910 and associates each global string with an enumeration value for use by the CAD application. That is, the CAD application 105 populates entries in the table 600. For example, the rows 610 of table 600 are populated as part of step 915. Rows 610 include the network part types from the network part schema 470 that are hard coded as part of CAD application 105. If a given global string is recognized by the CAD application 105, then the CAD application is already "aware" of the correct enumeration value (step 915). Otherwise, the CAD application 105 may assign unrecognized network parts with next available custom enumeration value (step 920). For example, rows 615 of table 600 illustrate rows populated as part of step 920.

The part property attributes stored with the CAD model 120 may be read in from the CAD model 120 and used to populate entries in table 700. Recognized part attributes are associated with the correct hard-coded enumeration values, and unrecognized part attributes may be assigned the next available custom enumeration value. Thus, each network part attribute, and its associated global string, local string, and other data values, may be used to create entries in table 700.

Once the network part schema 470 is fully read into parts list 102, a user may interact with the CAD application 105 to view or modify the CAD model 120. For example, the parts may be added to the model without modifying the network part schema 470. However, users may decide to declare new part attributes and network part types according to the methods described herein. When the model is saved again, the global strings for each part and part attribute are written to the file associated with the CAD model 120. Thus, the network schema 470 may persist and grow over multiple sessions. Further, different users may share copies of the CAD model without having to ensure that each has the correct version of a network parts catalog or CAD application in order to share 3D models with one another.

The features and functions provided by the CAD application 105 may process both the hard-coded network parts and the extended network parts in a similar manner, transparently to users of the application. For example, dialog boxes used to display the properties associated with a network part will include an attribute declared by a user for the particular CAD model 120, e.g., the dialog box 200 illustrated in FIG. 2. Also, when used to generate 2D construction or engineering documents, any schedules printed with the 2D drawings may include the extended attributes, e.g., the schedule 545 illustrated in FIG. 5. Thus, users are provided a great deal of flexibility in creating a CAD model 120. Instead of having to rely on a developer to add hard-coded attributes to a CAD model 120, the user may simply declare extensions to the hard-coded network parts or network part attribute to include a desired property.

While the foregoing is directed to embodiments of the present invention, other embodiments of the invention may be devised without departing from the basic scope thereof, and the scope thereof is determined by the claims that follow.

What is claimed is:

1. A computer-implemented method for performing operations on a computer generated model of a real-world utility network in a computer-aided design (CAD) application, the method comprising:

retrieving a network part schema associated with the computer generated model, wherein the network part schema identifies a collection of network parts included in the computer generated model and wherein each network part is uniquely identified by a global identifier;

parsing the network part schema to determine a first set of global identifiers associated with a set of pre-defined network part types and corresponding attributes;

associating each pre-defined network part type and one or more corresponding attributes in the set of pre-defined network part types and corresponding attributes with a different pre-determined enumeration value;

parsing the network part schema to determine a second set of global identifiers associated with a set of user-defined network part types and corresponding attributes;

generating a different custom enumeration value for each user-defined network part type and one or more corresponding attributes in the set of user-defined network part types and corresponding attributes;

associating each user-defined network part type and corresponding one or more attributes in the set of user-defined network part types and corresponding attributes with a different generated custom enumeration value; and performing an operation on at least one of the network parts in the collection of network parts included in the computer generated model based on either one of the pre-determined enumeration values or one of the custom enumeration values.

2. The computer-implemented method of claim 1, wherein each network part corresponds to a physical component used to construct the real-world utility network.

3. The computer-implemented method of claim 1, wherein each network part further includes a local identifier used as a label for the network part on graphical screen displays generated by the CAD application.

4. The computer-implemented method of claim 1, wherein a user-defined network part type may be declared by supplying a global identifier and a local identifier for the user-defined network part type.

5. The computer-implemented method of claim 1, wherein each network part includes a set of extensible part attributes.

6. The computer-implemented method of claim 1, wherein the CAD application is configured to generate two-dimensional (2D) depictions of the computer generated model, wherein schedules associated with the 2D depictions display attribute type/value pairs for the network parts included in the extended network part schema.

7. The computer-implemented method of claim 1, wherein the operation comprises searching the collection of network parts, listing the collection of network parts or traversing the collection of network parts.

8. A computer-readable medium containing a program which when executed by a processor, performs operations on a computer generated model of a real-world utility network in a computer-aided design (CAD) application, by performing the steps of:

retrieving a network part schema associated with the computer generated model, wherein the network part schema identifies a collection of network parts included in the computer generated model and wherein each network part is uniquely identified by a global identifier;

parsing the network part schema to determine a first set of global identifiers associated with a set of pre-defined network part types and corresponding attributes;

associating each pre-defined network part type and one or more corresponding attributes in the set of pre-defined network part types and corresponding attributes with a different pre-determined enumeration value;

parsing the network part schema to determine a second set of global identifiers associated with a set of user-defined network part types and corresponding attributes;

generating a different custom enumeration value for each user-defined network part type and one or more corresponding attributes in the set of user-defined network part types and corresponding attributes;

associating each user-defined network part type and corresponding one or more attributes in the set of user-defined network part types and corresponding attributes with a different aenerated custom enumeration value; and performing an operation on at least one of the network parts in the collection of network parts included in the computer generated model based on either one of the pre-determined enumeration values or one of the custom enumeration values.

9. The computer-readable medium of claim 8, wherein each network part corresponds to a physical component used to construct the real-world utility network.

10. The computer-readable medium of claim 9, wherein the utility network comprises a pipeline network, an electric power-grid network, or a surface water drainage network.

11. The computer-readable medium of claim 8, wherein each network part further includes a local identifier used as a label for the network part on graphical screen displays generated by the CAD application.

12. The computer-readable medium of claim 8, wherein a user-defined network part type may be declared by supplying a global identifier and a local identifier for the user-defined network part type.

13. The computer-readable medium of claim 8, wherein the CAD application is configured to generate two-dimensional (2D) depictions of the computer generated model, wherein schedules associated with the 2D depictions display attribute type/value pairs for the network parts included in the extended network part schema.

14. The computer-readable medium of claim 8, wherein each network part includes a set of extensible part attributes.

15. The computer-readable medium of claim 14 wherein each extended attribute associated with a network part is assigned an enumeration value, a global identifier and a local identifier.

16. A computing device, comprising:

a processor; and a memory configured to store an application that includes instructions which, when executed by the processor, cause the processor to perform operations on a computer generated model of a real-world utility network in a computer-aided design (CAD) application, including the steps of:

retrieving a network part schema associated with the cormputer generated model, wherein the network part schema identifies a collection of network parts included in the computer generated model and wherein each network part is uniquely identified by a global identifier;

parsing the network part schema to determine a first set of global identifiers associated with a set of pre-defined network part types and corresponding attributes;

associating each pre-defined network part type and one or more corresponding attributes in the set of pre-defined network part types and corresponding attributes with a different pre-determined enumeration value;

parsing the network part schema to determine a second set of global identifiers associated with a set of user-defined network part types and corresponding attributes;

generating a different custom enumeration value for each user-defined network part type and one or more corresponding attributes in the set of user-defined network part types and corresponding attributes;

associating each user-defined network part type and corresponding one or more attributes in the set of user-defined network part types and corresponding attributes with a corresponding generated custom enumeration value; and performing an operation on at least one of the network parts in the collection of network parts included in the computer generated model based on either one of the pre-determined enumeration values or one of the custom enumeration values.

17. The computing device of claim 16, wherein each network part corresponds to a physical component used to construct the real-world utility network.

18. The computing device of claim 16, wherein each network part further includes a local identifier used as a label for the network part on graphical screen displays generated by the CAD application.

19. The computing device of claim 16, wherein a user-defined network part type may be declared by supplying a global identifier and a local identifier for the user-defined network part type.

20. The computing device of claim 16, wherein each network part includes a set of extensible part attributes.

21. The computing device of claim 16, wherein the CAD application is configured to generate two-dimensional (2D) depictions of the computer generated model, wherein schedules associated with the 2D depictions display attribute type/value pairs for the network parts included in the extended network part schema.

* * * * *